United States Patent
Repetto et al.

(10) Patent No.: US 8,955,372 B2
(45) Date of Patent: Feb. 17, 2015

(54) SYSTEMS AND METHODS FOR CONTINUOUS PRESSURE CHANGE MONITORING IN TURBINE COMPRESSORS

(75) Inventors: Horacio Repetto, Greenville, SC (US); Christopher Warren Childs, Greenville, SC (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 13/585,478

(22) Filed: Aug. 14, 2012

(65) Prior Publication Data
US 2014/0047911 A1 Feb. 20, 2014

(51) Int. Cl.
*G01M 15/14* (2006.01)

(52) U.S. Cl.
USPC ....................................................... 73/112.05

(58) Field of Classification Search
CPC ..................................................... G01M 15/14
USPC ................ 73/112.01, 112.03, 112.05, 112.06
See application file for complete search history.

(56) References Cited

U.S. PATENT DOCUMENTS

| | | | |
|---|---|---|---|
| 3,852,958 A * | 12/1974 | Adams et al. | 60/39.281 |
| 3,867,717 A * | 2/1975 | Moehring et al. | 340/626 |
| 4,399,548 A | 8/1983 | Castleberry | |
| 6,298,718 B1 * | 10/2001 | Wang | 73/114.01 |
| 7,104,120 B2 * | 9/2006 | Gladden | 73/114.77 |
| 7,469,577 B2 * | 12/2008 | Barton | 73/114.77 |
| 2005/0193810 A1* | 9/2005 | Gladden | 73/119 R |
| 2008/0011071 A1* | 1/2008 | Figura | 73/118.1 |
| 2010/0146966 A1* | 6/2010 | Burkhardt et al. | 60/602 |
| 2013/0073170 A1* | 3/2013 | Drohan et al. | 701/100 |

* cited by examiner

*Primary Examiner* — Eric S McCall
(74) *Attorney, Agent, or Firm* — Sutherland Asbill & Brennan LLP

(57) ABSTRACT

Systems and methods for continuous pressure change monitoring in turbine compressors. In one embodiment, a system can be provided. The system can include a dynamic pressure sensing device mounted to the turbine compressor. The dynamic pressure sensing device may be configured to provide continuous dynamic pressure data, which may be associated with one or more pressure change events. The system may further include a memory configured to store the continuous dynamic pressure data, and a processor configured to correlate the one or more pressure change events with one or more component failures of the turbine compressor, and, based at least in part on the correlation, diagnose the one or more component failures.

18 Claims, 7 Drawing Sheets

SYSTEMS AND METHODS FOR CONTINUOUS PRESSURE CHANGE MONITORING IN TURBINE COMPRESSORS

TECHNICAL FIELD

This disclosure relates generally to turbines and, more particularly, to systems and methods for continuous pressure change monitoring in turbine compressors.

BACKGROUND

Under certain conditions, turbine compressors may experience phenomena related to pressure changes. The phenomena may include a compressor surge or a compressor stall and, occur, for example, when forward flow through a compressor can no longer be maintained due to an increase in pressure across the compressor, which results in a momentary flow reversal.

Traditionally, accelerometers mounted to bearings have been used to detect and count surge events experienced by a turbine compressor. Accelerometers may detect surge events through vibrations of a turbine compressor and are thus able to detect major surge events only, leaving minor surges or stalls unnoticed. This puts a turbine compressor at risk, because surge events, even minor, may cause permanent damage to either or both rotating and stationary blades, sometimes resulting in a catastrophic failure (e.g., rotor blade liberation). Even when it seems that the turbine has avoided catastrophic failure, its air foils may still be damaged resulting in an increased propensity of the turbine to experience successive surge conditions.

Additionally, though the process of surging has been studied, the causes of such events may still be unclear due to the lack of data. Some measurements have been performed for dedicated field testing units only for a very limited amount of time, because measurements and supporting systems used during those tests require an increased amount of supporting infrastructure and external/additional systems on site. The measurements have been collected for gas turbine units that were forced to behave in a certain way at specific arbitrary conditions to simulate the surge effects. However, the measurements were never collected continuously during normal gas turbine operation and integrated into the existing components and control systems.

SUMMARY OF THE DISCLOSURE

The present disclosure relates to systems and methods for continuous pressure change monitoring in turbine compressors. According to one embodiment, a method can be provided. The method can include mounting a dynamic pressure sensing device to the turbine compressor via an opening in a wall of the turbine compressor, receiving continuous dynamic pressure data from the pressure sensing device, wherein the continuous dynamic pressure data is associated with one or more pressure change events, correlating the one or more pressure change events with one or more component failures of the turbine compressor, and, based at least in part on the correlation, diagnosing the one or more component failures.

According to another embodiment a system can be provided. The system can include a dynamic pressure sensing device installed in a wall of the turbine compressor, the dynamic pressure sensing device configured to provide continuous dynamic pressure data, the continuous dynamic pressure data associated with one or more pressure change events, a memory configured to store the continuous dynamic pressure data, and a processor configured to correlate the one or more pressure change events with one or more component failures of the turbine compressor, and, based at least in part on the correlation, diagnose the one or more component failures.

According to yet another embodiment a method can be provided. The method can include providing a mechanical adapter, mounting a dynamic pressure sensing device to the gas turbine compressor via the mechanical adapter, wherein the dynamic pressure device is mounted to an opening in a wall of the gas turbine compressor, the dynamic pressure sensing device comprising a transducer converting a dynamic pressure component into an electrical signal, receiving continuous dynamic pressure data from the pressure sensing device, the continuous dynamic pressure data associated with one or more pressure change events, correlating the one or more pressure change events with one or more component failures of the gas turbine compressor, based at least in part on the correlation, diagnosing the one or more component failures, and, based at least in part on the diagnosis, predicting one or more future component failures.

In further examples, systems, subsystems, or devices may be adapted to provide functionality associated with various example embodiments. These and other features, examples, and embodiments are described in more detail below in the detailed description that follows through reference to the accompanying drawings.

DETAILED DESCRIPTION

Figure 1:
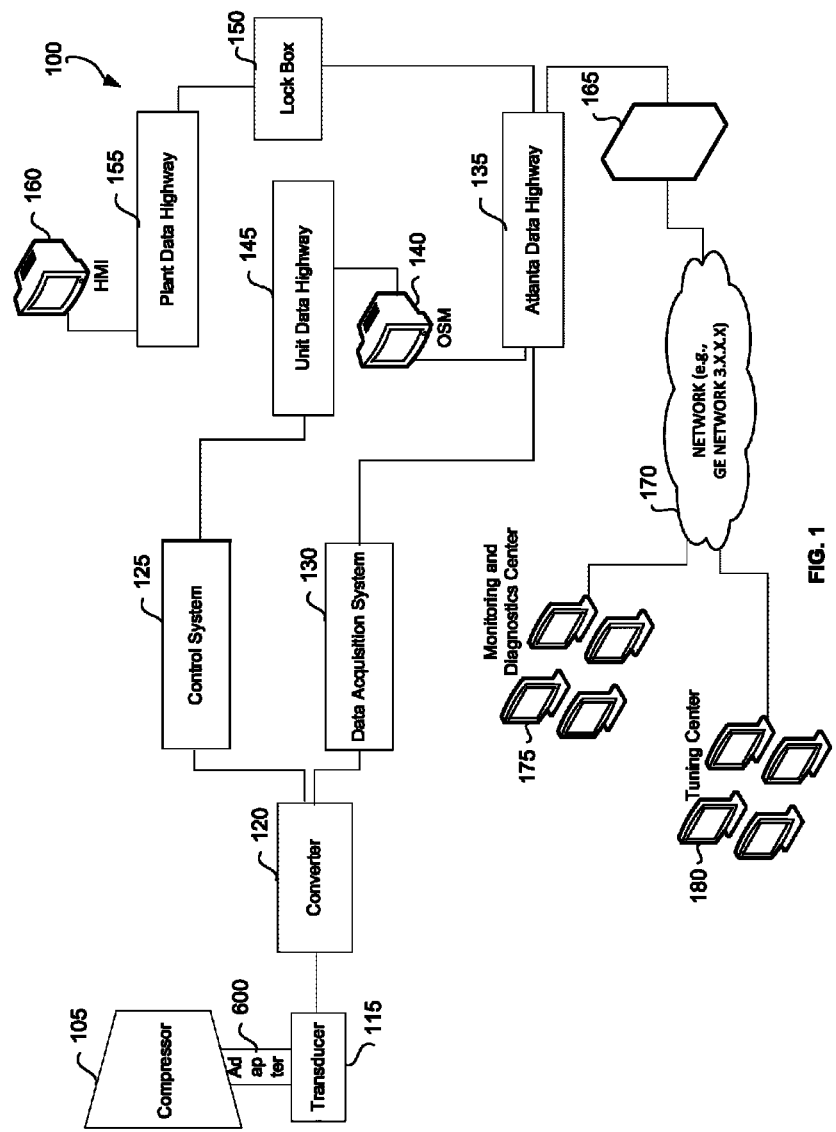
FIG. 1 depicts a block diagram illustrating an example system environment in accordance with an embodiment of the disclosure.

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for continuous pressure change monitoring in turbine compressors. Certain embodiments can provide for detecting and diagnosing pressure change events in a turbine compressor using a dynamic pressure sensing device, such as a transducer, mounted to the turbine compressor via an opening in a wall of the turbine compressor. Existing openings in a wall of the turbine compressor, such as borescope ports, may be used to mount the dynamic pressure sensing device. Because the existing openings and dynamic pressure sensing devices may disagree in size and/or connectivity means, a mechanical adapter may be used in configuring the opening to receive the dynamic pressure sensing device.

When installed, the dynamic pressure sensing device may measure any variations of the dynamic component of pressure within one or more areas of the compressor to detect sudden changes in pressure that could lead to a surge event. Based on the detected pressure changes, the disclosed method may provide more accurate data than would be possible with the existing solutions, such as, for example, methods based on detecting compressor vibrations using accelerometers. The dynamic pressure sensing devices may detect and quantify various levels of pressure changes, including the levels that are difficult to identify with the existing solutions. Accordingly, the method disclosed herein may allow detecting a plurality of surge event levels and correlating the plurality of surge event levels to component failures and/or operating parameters of a turbine compressor.

Additionally, continuously collecting dynamic pressure data during normal operation of turbine compressors and obtaining correlation data may enable early detection of potential compressor surge issues and prevention of turbine compressor damage that would otherwise make a turbine unit unavailable for a period of time. The collected dynamic pressure data may enable yielding root causes for many issues on installed turbines, thus allowing future component failures to be predicted, and providing engineering solutions to mitigate the future component failures.

In some example embodiments, the dynamic pressure sensing device may be coupled to a control system and/or data system, which may store the data obtained from the dynamic pressure sensing device and continuously log potential events. Based on the obtained data, the control system may trigger potential alarms upon determining that certain pressure levels have been reached.

In some embodiments, the continuous dynamic pressure data may be monitored remotely and stored for future access and correlation to other turbine events.

The disclosure herein can provide for a useful and effective tool of detecting and diagnosing pressure change events in a turbine compressor using a dynamic pressure sensing device mounted to the turbine compressor via an opening in a wall of the turbine compressor. Thus, the disclosure can provide new ways of detecting and predicting rotation stall or surge events.

The technical effects of certain embodiments of the disclosure may include accurately detecting and diagnosing pressure change events in gas turbines. Specifically, the technical effects may include early detection of potential compressor surge issues and preventing gas turbine compressor damage. Further technical effects may include correlating various levels of surge events to operating parameters to understand the causes of surge or stall events, and to determine possible countermeasures.

The following provides the detailed description of various example embodiments related to systems and methods for continuous pressure change monitoring.

Referring now to FIG. 1, a block diagram illustrates a system environment 100 suitable for implementing a method for detecting and diagnosing pressure change events in a turbine compressor, in accordance with one or more example embodiments. In particular, the system environment 100 may comprise a compressor 105, a transducer 115, a mechanical adapter 600, a converter 120, a control system 125, a data acquisition system 130, an Atlanta Data Highway 135, an onsite monitor (OSM) 140, a Unit Data Highway 145, a lock box 150, a Plant Data Highway 155, a human-machine interface (HMI) 160, a firewall 165, a network 170, a monitoring and diagnostics center 175, and a tuning center 180.

The transducer 115 may be installed in a wall of the compressor 105 via an existing opening (e.g., a borescope port) with the help of the mechanical adapter 600. The transducer 115 may continuously measure any variations of the dynamic component of pressure at multiple stages of the turbine compressor and provide corresponding signals to the converter 120 (or signal conditioner), which may transform these signals and transmit them to the control system 125 and/or to the data acquisition system 130.

The control system 125 may receive the transformed signals, monitor, and continuously log all potential events, as well as trigger potential alarms when certain surge pressure levels are reached. Data from the control system 125 may be communicated to the OSM 140 through the Unit Data Highway 145 and to the HMI 160 through the Plant Data Highway 155. The Plant Data Highway 155 may communicate with the lock box 150 to allow remote control of the HMI 160. The Atlanta Data Highway 135 may communicate with the data acquisition system 130 and enable communication of the data acquisition system 130 and/or the control system 125 with the network 170.

With continuing reference to FIG. 1, the network 170 may include the Internet or any other network capable of communicating data between devices (for example, General Electric network 3.X.X.X). Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, Global Positioning System (GPS), CDPD (cellular digital packet data), RIM (Research in Motion, Limited) duplex paging network, Bluetooth radio, or an IEEE 802.11-based radio frequency network. The communication network 170 can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Communications with the network 170 may be performed using the firewall 165. These communications may enable data exchange with the monitoring and diagnostics center 175, the tuning center 180, and other control and monitoring systems (not shown).

Figure 2:
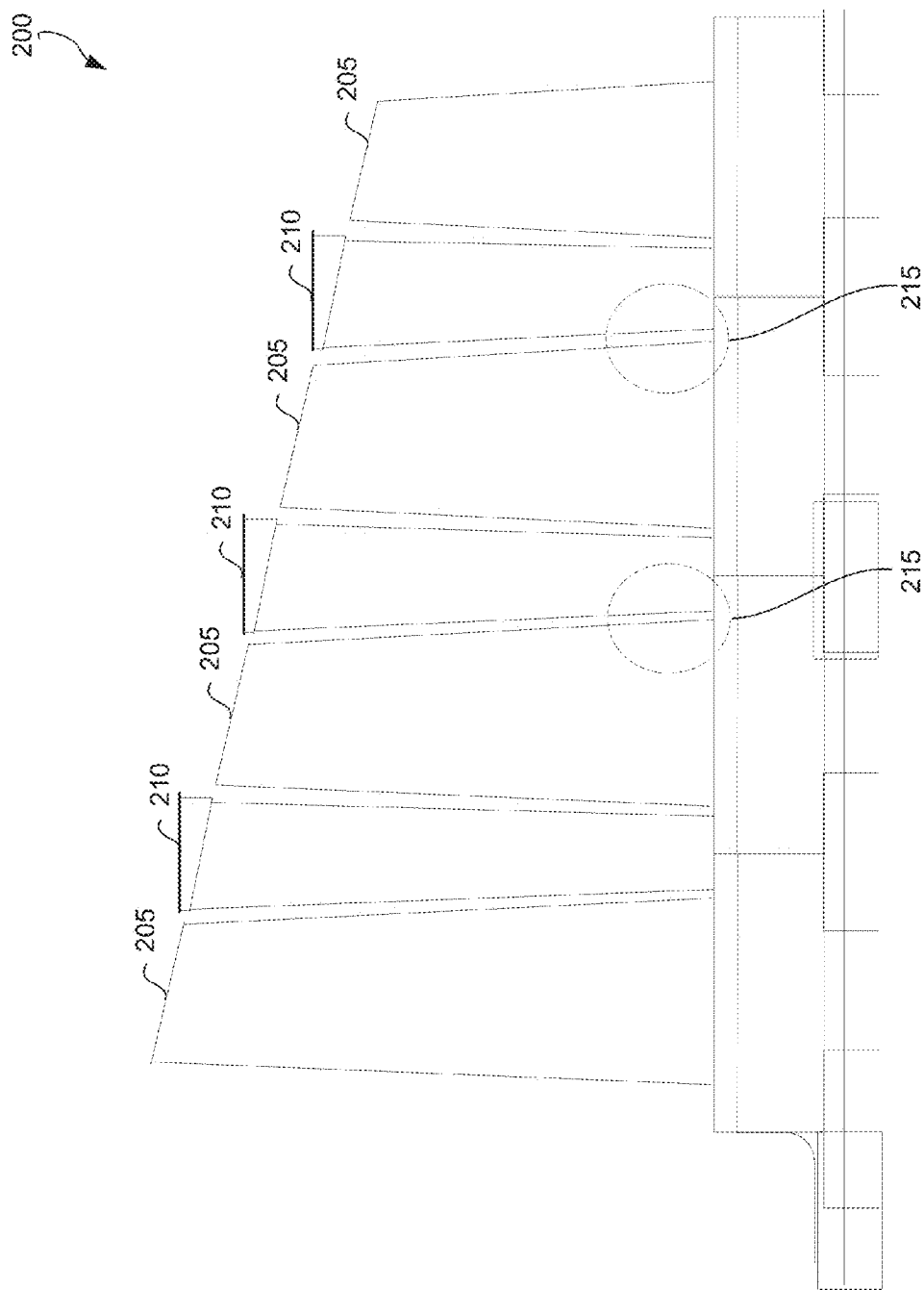
FIG. 2 depicts an example turbine compressor in accordance with an embodiment of the disclosure.

FIG. 2 depicts a simplified representation of a turbine compressor with areas of potential blade to vane clashing. A turbine compressor 200, such as a gas turbine compressor and the like, may comprise blades 205 (rotating airfoils) and vanes 210 (stationary airfoils). Under certain conditions, such as pressure change events, including surges or stalls, an adjacent blade 205 and vane 210 may contact each other. Areas of possible contact 215 are illustrated in FIG. 2. Though in FIG. 2 such areas of possible contact 215 are illustrated for two adjacent blades 205 and vanes 210, contact or clashing may take place on any adjacent blades 205 and vanes 210. Contact between an adjacent blade 205 and vane 210 may cause damage to the blade 205 and vane 210, which may result in rotor blade liberation and catastrophic failure. And even minor surges or stalls may cause damage to airfoils that may increase the propensity of the turbine to experience successive surge conditions.

Figure 3:
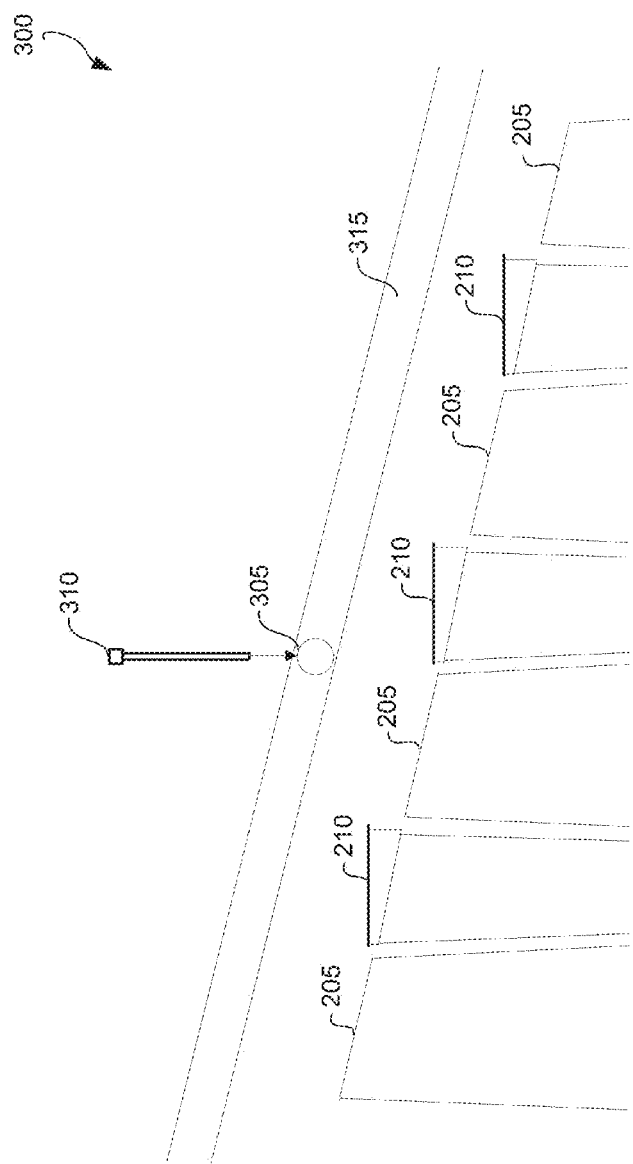
FIG. 3 depicts a simplified representation of mounting 300 a dynamic pressure sensing device on a turbine compressor, in accordance with one or more example embodiments.

FIG. 3 depicts a simplified representation of mounting 300 a dynamic pressure sensing device on a turbine compressor, in accordance with one or more example embodiments. Typically, turbine compressors have special openings 305 in their walls 315. These openings 305, often referred to as boroscope ports or holes, are meant for boroscopic inspection of the interior of a turbine. The openings 305 or other available openings in a wall 315 of the compressor 105 may provide access to the interior of the turbine compressor and may be used to install a dynamic pressure sensing device 310, including various sensors, detectors, transducers, and so forth.

Additionally, the use of existing openings 305 may enable continuously obtaining dynamic pressure data and other parameters during normal operation of a turbine. Dynamic pressure data obtained this way may provide more realistic information in comparison to data collected for turbine units that were forced to behave in a certain way at specific arbitrary conditions to simulate the surge effects.

Figure 4:
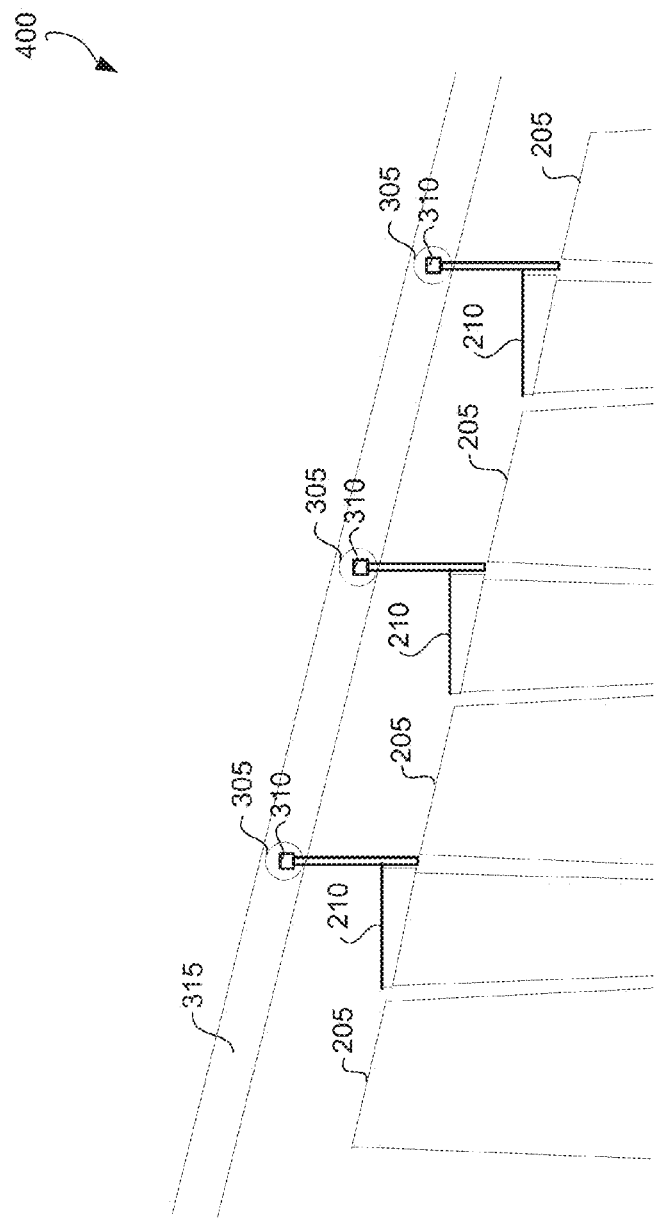
FIG. 4 depicts a simplified representation of mounted dynamic pressure sensing devices 400 in a turbine compressor, in accordance with one or more example embodiments.

FIG. 4 depicts a simplified representation of mounted dynamic pressure sensing devices 400 in a turbine compressor, in accordance with one or more example embodiments. As shown in FIG. 4, the dynamic pressure sensing devices 310 may be installed in the openings 305 used for boroscopic inspection of the interior of a turbine. When installed, the dynamic pressure sensing devices 310, such as sensors, detectors, transducers, and so forth, may continuously provide data on dynamic pressure in the turbine compressor during normal operating conditions of the turbine. Additionally, the dynamic pressure sensing devices 310 may allow detecting of all levels of surge events, even minor ones, and would provide data for correlation of all levels of surge events to operating parameters.

The data obtained from the dynamic pressure sensing devices 310 may be stored, analyzed based on some aeromechanical principles, and processed to determine stall and surge events of various levels and intensity that occur on a turbine compressor. Determined stall and surge events of various levels and intensity may then be correlated with component failures on the turbine compressor. The correlation data may enable the diagnosis of non-evident component failures, early detection of potential compressor surge issues, and prevention of turbine compressor damage.

In certain example embodiments, the data from the dynamic pressure sensing devices 310 may be used to determine root causes, parameters, and/or ambient conditions related to surge and/or stall events. Knowledge and understanding of these causes, parameters, and/or ambient conditions may allow predicting and provide engineering solutions to mitigate future component failures.

In certain example embodiments, certain pressure or pressure change rate thresholds may be predetermined. When a pressure and/or pressure change rate inside a turbine compressor exceeds the predetermined threshold, based on the data from the dynamic pressure sensing devices 310, an alarm may be triggered.

In certain example embodiments, the dynamic pressure sensing devices 310 may be coupled to a monitoring system to perform remote monitoring of the continuous dynamic pressure data.

In certain example embodiments, the dynamic pressure sensing devices 310 may not be suitable to install in the openings 305. In such cases, special mechanical adapters may be applied.

Figure 5:
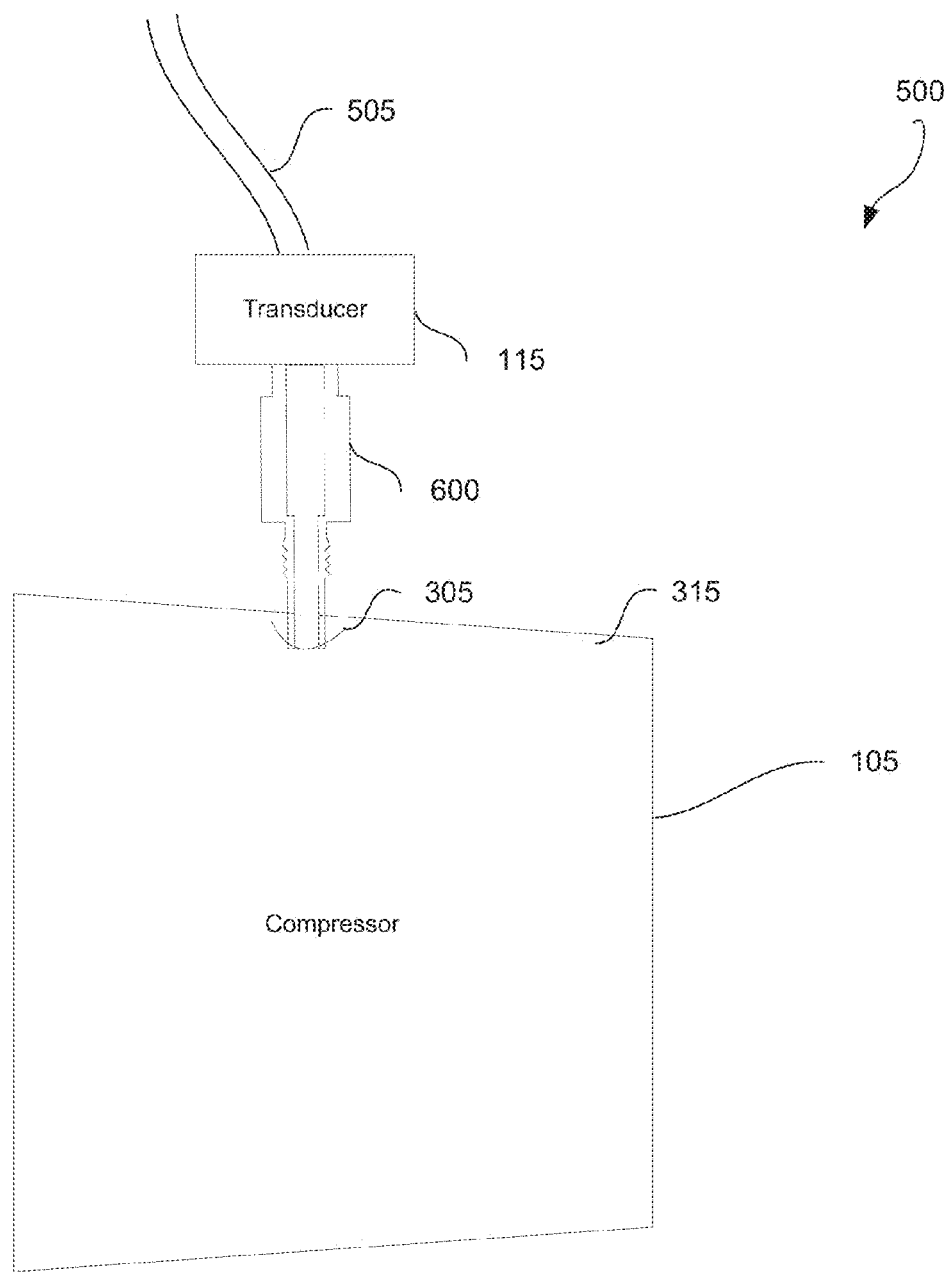
FIG. 5 depicts a simplified representation of installation 500 of a sensing device using an adapter, in accordance with one or more example embodiments.

FIG. 5 depicts a simplified representation of installation 500 of a sensing device using an adaptor, in accordance with one or more example embodiments. The opening 305 in the wall 315 of the compressor 105 may be not suitable for installation of a dynamic pressure sensing device, such as the transducer 115, for a variety of reasons. To fix this problem, a special mechanical adapter 600 may be used. The mechanical adapter may provide an appropriate fit between the transducer 115 and the opening 305 in the wall 315 of the compressor 105, with differently sized adapters being used for dynamic pressure sensing devices 310 of different dimensions or shapes. The transducer 115 may be coupled to storing and processing devices using a connection 505.

Figure 6:
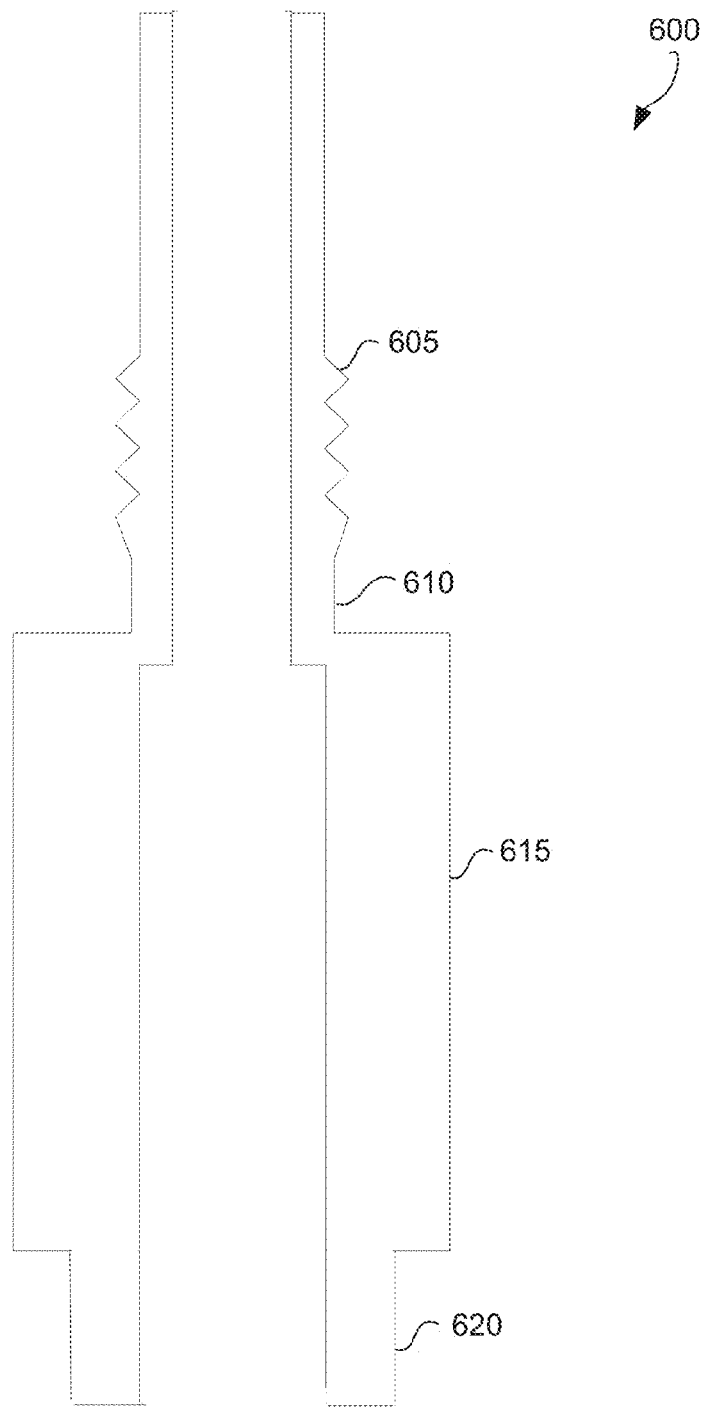
FIG. 6 depicts a representation of an example mechanical adapter used to configure an opening in a wall of a turbine compressor to receive a pressure sensing device, in accordance with an embodiment of the disclosure.

FIG. 6 depicts a simplified representation of a mechanical adapter 600 used to configure an opening in a wall of a turbine compressor to receive a pressure sensing device, in accordance with one or more embodiments. The mechanical adapter 600, illustrated in cross-section, may be made of various materials for example, carbon steel or mild stainless steel (not shown). The mechanical adapter 600 may comprise a neck 610, a fastener 605, a main body portion 615, and a sensing device connection portion 620. The mechanical adapter 600 may be coupled to the opening 305 of the wall 315 of the compressor 105 to provide connection of the dynamic pressure sensing device 310 to the compressor 105 and dispose the dynamic pressure sensing device 310 to the interior of the compressor 105. Inside the compressor 105, the dynamic pressure sensing device 310, such as a transducer, may continuously detect dynamic pressure and transmit corresponding signals to the control system.

With continuing reference to FIG. 6, the fastener 605 may couple the mechanical adapter 600 to the wall 315 of the compressor 105. In some embodiments, the fastener 605 may include threads that are threaded into the opening 305 in the wall 315 of the compressor 105. The thread may have dimensions and parameters that correspond to the dimensions and parameters of the opening 305 to allow for a reliable fitting between them. In some example embodiments, the fastener 605 may include a ⅛ inch national pipe thread.

In optional embodiments, the fastener 605 may include an adhesive that couples the mechanical adapter 600 to the compressor 105. Additional fasteners may be contemplated, such as crimps, interference fits, and other fasteners sufficient to adjust the mechanical adapter 600 in the opening 305 of the compressor 105.

The dynamic pressure sensing device 310 may be fitted inside the mechanical adapter 600. In some embodiments, the dynamic pressure sensing device 310 may be slidably disposed within the mechanical adapter 600 before it is fixed to a location inside the mechanical adapter 600. Two flats of the main body portion 615 may be located apart for torquing purposes.

The dynamic pressure sensing device 310 may be introduced into the mechanical adapter 600 through the sensing device connection portion 620. The size of the sensing device connection portion 620 may be selected to match the size of the dynamic pressure sensing device 310.

Figure 7:
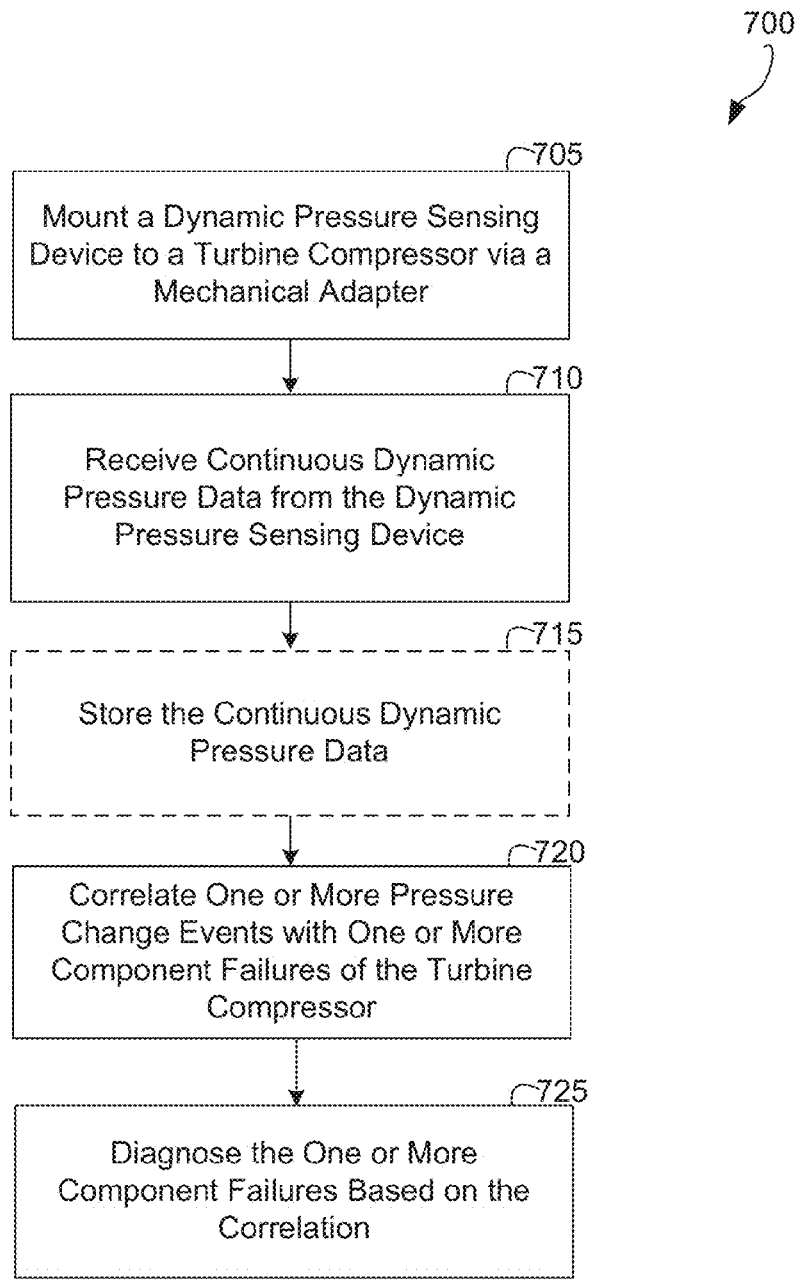
FIG. 7 depicts a process flow diagram illustrating an example method for detecting and diagnosing pressure change events in a turbine compressor in accordance with an embodiment of the disclosure.

FIG. 7 depicts a process flow diagram illustrating an example method 700 for detecting and diagnosing pressure change events in a turbine compressor, in accordance with one or more example embodiments. The method 700 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the control system 125, which may reside in a user device or in a server. The control system 125 may comprise processing logic. It will be appreciated by one of ordinary skill that instructions said to be executed by the control system 125 may, in fact, be retrieved and executed by one or more processors The control system 125 may also include memory cards, servers, and/or computer discs. Although the control system 125 may be configured to perform one or more steps described herein, other control units may be utilized while still falling within the scope of various embodiments.

As shown in FIG. 7, the method 700 may commence at operation 705 with mounting the dynamic pressure sensing device 310 to the compressor 105 of a turbine via the mechanical adapter 600. The mechanical adapter 600, which may be specially designed to correspond to the dimensions of the opening 305 of the corresponding turbine compressor and to the dimensions of the dynamic pressure sensing device 310, may be coupled to the opening 305 using the fastener 605 that may include threads, adhesives, crimps, interference fits, and other fasteners. With the help of the mechanical adapter 600, the dynamic pressure sensing device 310 may be disposed within the interior of the compressor 105, where it may continuously detect dynamic pressure and transmit corresponding signals to the control system 125.

At operation 710, the control system 125 may receive continuous dynamic pressure data from the dynamic pressure sensing device 310. The continuous dynamic pressure data may provide information related to surge and stall events of various levels, including minor and major events. The dynamic pressure data may be received during the normal operation of turbines, thus enabling early detection of potential compressor surge issues and prevention of turbine compressor damage that would make a turbine unit unavailable for a period of time. This data may enable determining root causes for many issues on installed turbines, thus allowing future component failures to be predicted, and providing engineering solutions to mitigate future component failures.

Optionally, at operation 715, the control system 125 may store the continuous dynamic pressure data, thereby allowing for future use of the historical data for various processing operations.

At operation 720, pressure change events, detected by the dynamic pressure sensing device 310, may be correlated to component failures experienced by the turbine compressor. The pressure change events may include one or more surges or stalls. Based on the correlation, the relations between surge or stall events and component failures may be established, and surge or stall events may be quantified and classified based on their intensity and associations with component failures of turbine units.

At operation 725, component failures may be diagnosed based on the correlation of surge or stall events and component failures. The continuous dynamic pressure data from the dynamic pressure sensing device 310 may be processed to determine surge or stall events experienced by a turbine compressor and, based on the correlation data, possible defects of the turbine compressor may be diagnosed. Possible defects of the turbine compressor may include, for example, cracks, damage to tips of air foils, and so forth.

In some example embodiments, the continuous dynamic pressure data may be collected during normal operation of the turbines and the obtained correlation data may be used to enable early detection of potential compressor surge issues and prevent turbine compressor damage that would make a turbine unit unavailable. This data may enable determining root causes for many issues on installed turbines, thus allowing future surge events and component failures to be predicted and prevented, and providing engineering solutions to mitigate future component failures.

In some example embodiments, certain pressure or pressure change rate thresholds may be predetermined for turbine compressors, so that when the certain pressure or pressure change rate thresholds are exceeded inside a turbine compressor, one or more alarms are triggered.

Additionally, in certain example embodiments, the continuous dynamic pressure data may be monitored remotely via a monitoring system communicatively coupled to the control system.

References are made to block diagrams of systems, methods, apparatuses, and computer program products according to various example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, and so forth.

Application programs that are components of the systems and methods described herein may include routines, programs, components, data structures, and so forth that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting and diagnosing pressure change events in a turbine compressor, the method comprising:
    mounting a dynamic pressure sensing device to the turbine compressor via an opening in a wall of the turbine compressor;
    receiving, by a control system, continuous dynamic pressure data from the dynamic pressure sensing device, wherein the continuous dynamic pressure data is associated with one or more pressure change events;
    correlating the one or more pressure change events with one or more component failures of the turbine compressor;
    based at least in part on the correlation, diagnosing the one or more component failures;
    predicting one or more future component failures based at least in part on the continuous dynamic pressure data; and
    based at least in part on the prediction, providing one or more countermeasures to mitigate the one or more future component failures.

2. The method of claim 1, further comprising:
    determining, based at least in part on the continuous dynamic pressure data, that a pressure inside the turbine compressor has exceeded a predetermined pressure threshold; and
    based at least in part on the determination, triggering an alarm.

3. The method of claim 1, further comprising:
    determining, based at least in part on the continuous dynamic pressure data, that a rate of change of pressure inside the turbine compressor has exceeded a predetermined pressure threshold; and
    based at least in part on the determination, triggering an alarm.

4. The method of claim 1, further comprising installing a mechanical adapter either within the opening or to the dynamic pressure sensing device to configure the opening to receive the dynamic pressure sensing device.

5. The method of claim 1, wherein the dynamic pressure sensing device comprises a transducer configured to convert a dynamic pressure component into an electrical signal.

6. The method of claim 1, further comprising analyzing the continuous dynamic pressure data based at least in part on one or more aeromechanical principles governing operation of the turbine compressor.

7. The method of claim 1, wherein the turbine compressor comprises a gas turbine compressor.

8. The method of claim 1, further comprising remotely monitoring the continuous dynamic pressure data.

9. A system for detecting and reporting pressure change events in a turbine compressor, the system comprising:
    a dynamic pressure sensing device installed in a wall of the turbine compressor, the dynamic pressure sensing device configured to provide continuous dynamic pressure data, the continuous dynamic pressure data associated with one or more pressure change events;
    a memory configured to store the continuous dynamic pressure data; and
    a processor configured to:
        correlate the one or more pressure change events with one or more component failures of the turbine compressor;
        based at least in part on the correlation, diagnose the one or more component failures
        predict one or more future component failures based at least in part on the continuous dynamic pressure data; and
        based at least in part on the prediction, provide one or more countermeasures to mitigate the one or more future component failures.

10. The system of claim 9, further comprising an alarm system to trigger an alarm when the continuous dynamic pressure data indicates that pressure has exceeded a predetermined threshold.

11. The system of claim 9, further comprising an alarm system to trigger an alarm when the continuous dynamic pressure data indicates that a rate of change of pressure has exceeded a predetermined threshold.

12. The system of claim 9, wherein the wall comprises an opening to receive a mechanical adapter and the dynamic pressure sensing device.

13. The system of claim 9, wherein the dynamic pressure sensing device comprises a transducer configured to convert a dynamic pressure component into an electrical signal.

14. The system of claim 9, wherein the processor is configured to analyze the continuous dynamic pressure data based at least in part on one or more aeromechanical principles governing operation of the turbine compressor.

15. The system of claim 9, wherein the turbine compressor comprises a gas turbine compressor.

16. The system of claim 9, further comprising a monitoring system configured to remotely monitor the continuous dynamic pressure data.

17. The system of claim 9, wherein continuous dynamic pressure data is provided while the dynamic pressure sensing device is operating under normal operating conditions.

18. A method for detecting and diagnosing pressure change events in a gas turbine compressor, the method comprising:
    providing a mechanical adapter;
    mounting a dynamic pressure sensing device to the gas turbine compressor via the mechanical adapter, wherein the dynamic pressure sensing device is mounted to an opening in a wall of the gas turbine compressor, the dynamic pressure sensing device comprising a transducer converting a dynamic pressure component into an electrical signal;

receiving, by a control system, continuous dynamic pressure data from the dynamic pressure sensing device, the continuous dynamic pressure data associated with one or more pressure change events;

correlating the one or more pressure change events with one or more component failures of the gas turbine compressor;

based at least in part on the correlation, diagnosing the one or more component failures; and based at least in part on the diagnosis, predicting one or more future component failures.

* * * * *